United States Patent
Smith et al.

(10) Patent No.: US 11,614,160 B1
(45) Date of Patent: Mar. 28, 2023

(54) SHIFT GATE ASSEMBLY FOR VEHICLE INCLUDING GATE SEAL AND METHOD OF USING SAME

(71) Applicant: Honda Motor Co., Ltd., Tokyo (JP)

(72) Inventors: Shane R. Smith, Raymond, OH (US); Scott D. Batdorf, Raymond, OH (US); Lee N. Bowers, Raymond, OH (US); Bradford A. McDavid, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/695,094

(22) Filed: Mar. 15, 2022

(51) Int. Cl.
  *F16H 59/02* (2006.01)
  *F16H 59/10* (2006.01)
  *B60K 20/08* (2006.01)
  *B60K 23/08* (2006.01)

(52) U.S. Cl.
  CPC ......... *F16H 59/0213* (2013.01); *B60K 20/08* (2013.01); *B60K 23/08* (2013.01); *F16H 59/10* (2013.01); *B60K 2023/0891* (2013.01)

(58) Field of Classification Search
  CPC ..... F16H 59/0213; F16H 59/10; G05G 25/04; Y10T 74/2093; B60K 20/08; B60K 23/08; B60K 2023/0891
  See application file for complete search history.

(56) References Cited

U.S. PATENT DOCUMENTS

| 1,037,631 | A | * | 9/1912 | Jones | ................... F16H 59/0213 49/355 |
|---|---|---|---|---|---|
| 1,457,141 | A | * | 5/1923 | Bockover | ............... G05G 25/04 180/90.6 |
| 3,954,027 | A | * | 5/1976 | Soderberg | ................ F16J 15/52 277/637 |
| 3,985,095 | A | * | 10/1976 | Nurse | ..................... G09F 11/00 116/DIG. 20 |
| 4,027,361 | A | * | 6/1977 | Yoneya | ................... A44B 19/26 180/90.6 |
| 4,116,086 | A | | 9/1978 | Langford et al. | |
| 4,630,499 | A | | 12/1986 | Hopkins | |
| 4,979,702 | A | * | 12/1990 | Franklin | ................. A44B 19/26 244/129.4 |
| 5,207,117 | A | * | 5/1993 | Bauer | ..................... F24F 13/12 277/345 |

(Continued)

FOREIGN PATENT DOCUMENTS

CN  201670108 U  12/2010
CN  103821920 A  5/2014
(Continued)

*Primary Examiner* — William C Joyce
*Assistant Examiner* — Gregory T Prather
(74) *Attorney, Agent, or Firm* — Kenealy Vaidya LLP

(57) ABSTRACT

A shift gate assembly that can include a shift plate, a gate seal and a shift lever. The shift plate can include a lever opening having an opening centerline. The gate seal can be made of an elastic material and connected to the shift plate and extend along the lever opening. The gate seal can include a slit extending along the lever opening and offset with respect to the opening centerline. The shift lever can extend through the lever opening and the slit, be selectively movable along the lever opening and the slit, and elastically deform the gate seal as the shift lever moves along the slit.

19 Claims, 9 Drawing Sheets

(56) References Cited

U.S. PATENT DOCUMENTS

| | | | |
|---|---|---|---|
| 5,435,424 A * | 7/1995 | Murakami | F16H 59/10 74/557 |
| 5,890,383 A * | 4/1999 | Chang | B60R 25/066 70/202 |
| 5,899,115 A | 5/1999 | Kataumi et al. | |
| 6,305,075 B1 | 10/2001 | Ersoy et al. | |
| 6,666,107 B2 | 12/2003 | Kim | |
| 6,931,961 B2 | 8/2005 | Bauer et al. | |
| 7,195,095 B2 * | 3/2007 | Oana | B60K 20/04 296/70 |
| 7,467,570 B2 | 12/2008 | Wang | |
| 7,484,433 B2 | 2/2009 | Arakawa et al. | |
| 7,587,958 B2 | 9/2009 | Gorman et al. | |
| 7,650,849 B2 | 1/2010 | Aso et al. | |
| 7,722,102 B2 * | 5/2010 | Hansen | B60R 7/04 296/37.8 |
| 7,891,267 B2 | 2/2011 | Aso et al. | |
| 9,004,496 B2 | 4/2015 | Gorham et al. | |
| 9,956,574 B2 * | 5/2018 | Schwab | B25J 21/00 |
| 10,234,020 B2 | 3/2019 | Vicenzo | |
| 2002/0117019 A1 * | 8/2002 | Kim | F16H 59/0213 74/566 |
| 2010/0061795 A1 * | 3/2010 | Czepczak | B60R 13/0262 29/505 |
| 2012/0228837 A1 * | 9/2012 | Gorham | F16J 15/106 277/650 |
| 2019/0226577 A1 | 7/2019 | Lalchandani | |
| 2020/0072344 A1 * | 3/2020 | Yasu | F16H 59/0213 |

FOREIGN PATENT DOCUMENTS

| | | |
|---|---|---|
| CN | 104500720 A | 4/2015 |
| DE | 10131439 C2 | 5/2003 |
| DE | 102005033026 A1 | 1/2007 |
| DE | 19851211 B4 | 4/2007 |
| DE | 102007008608 A1 | 3/2008 |
| JP | H06159488 A | 6/1994 |
| JP | 3184010 B2 | 7/2001 |
| JP | 2006182112 A | 7/2006 |
| JP | 3866461 B2 | 1/2007 |
| JP | 2011213151 A | 10/2011 |
| JP | 6083230 B2 | 2/2017 |
| KR | 101946878 B1 | 5/2019 |
| WO | 02052177 A1 | 7/2002 |

* cited by examiner

SHIFT GATE ASSEMBLY FOR VEHICLE INCLUDING GATE SEAL AND METHOD OF USING SAME

BACKGROUND

The disclosed subject matter relates to a shift gate system for a vehicle. More particularly, the disclosed subject matter relates to methods and apparatus that can control the flow of ambient air through a shift gate system.

A vehicle can include one or more heat sources located in a front space with respect to a longitudinal direction L of the vehicle (e.g., in an engine compartment located in front of a driver and passenger compartment). The heat source(s) can include a fluid-to-fluid heat exchanger, a battery pack, and/or an internal combustion engine. The heat exchanger can be configured to cool operating fluids such as, but not limited to, battery coolant, engine coolant, transmission fluid, engine oil, or engine intake air that has been compressed by a turbocharger or a supercharger. The heat source(s) can transfer heat to ambient air that enters the front space such that the heated air that exits the front space has a temperature that is greater than the ambient air outside of the vehicle.

The front space can include one or more paths for the heated air to exit the front space. The exit path can include, but is not limited to, any combination of a vent in a hood, a gap between the hood and a cowl, a vent in a front fender, and an opening at the bottom of the front space.

SUMMARY

Some embodiments are directed to a shift gate assembly that can include a shift plate, a gate seal and a shift lever. The shift plate can include a lever opening having an opening centerline. The gate seal can be made of an elastic material and connected to the shift plate and extend along the lever opening. The gate seal can include a slit extending along the lever opening and offset with respect to the opening centerline. The shift lever can extend through the lever opening and the slit, be selectively movable along the lever opening and the slit, and elastically deform the gate seal as the shift lever moves along the slit.

Some embodiments are directed to a shift gate assembly for a vehicle including an internal combustion engine, a multiple gear ratio transmission, and a plurality of wheels selectively driven by the transmission. The shift gate assembly can include a shift plate, a gate seal and a shift lever. The shift plate can include a first gate formed by a first main slot and a plurality of first gate slots extending from and spaced along the first main slot. The first main slot can include a first opening centerline. The first gate slots can correspond to a respective one of the gear ratios. The gate seal can be made of an elastic material, connected to the shift plate, and extend along the first main slot and the plurality of first gate slots. The gate seal can include a first slit extending along the first main slot and offset with respect to the first opening centerline. The shift lever can extend through the first slit, selectively move along the first main slot and the first slit and into any of the first gate slots, elastically deform the gate seal as the shift lever moves along the first slit and when the shift lever is in any of the first gate slots, and cause the transmission to selectively engage a respective one of the gear ratios when the shift lever is in a corresponding one of the first gate slots.

Some embodiments are directed to a shift gate assembly for selecting one of a plurality of gear ratios of a multiple gear ratio transmission. The shift gate assembly can include a shift gate, a gate seal and a shift lever. The shift plate can include a lever opening slot defined by a left side edge and a right side edge. The lever opening slot can include an opening centerline running between the left side edge and right side edge. The gate seal can be made of an elastic material and connected to the shift plate and extend along the lever opening. The gate seal can include a slit extending along the lever opening slot and offset with respect to the opening centerline such that the slit is closer to one of the left side edge and right side edge. The shift lever can extend through the lever opening slot and the slit, selectively move along the lever opening slot and the slit, elastically deform the gate seal as the shift lever moves along the slit, and cause the transmission to selectively engage a respective one of the gear ratios based on a stopping position of the shift lever in the lever opening slot.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
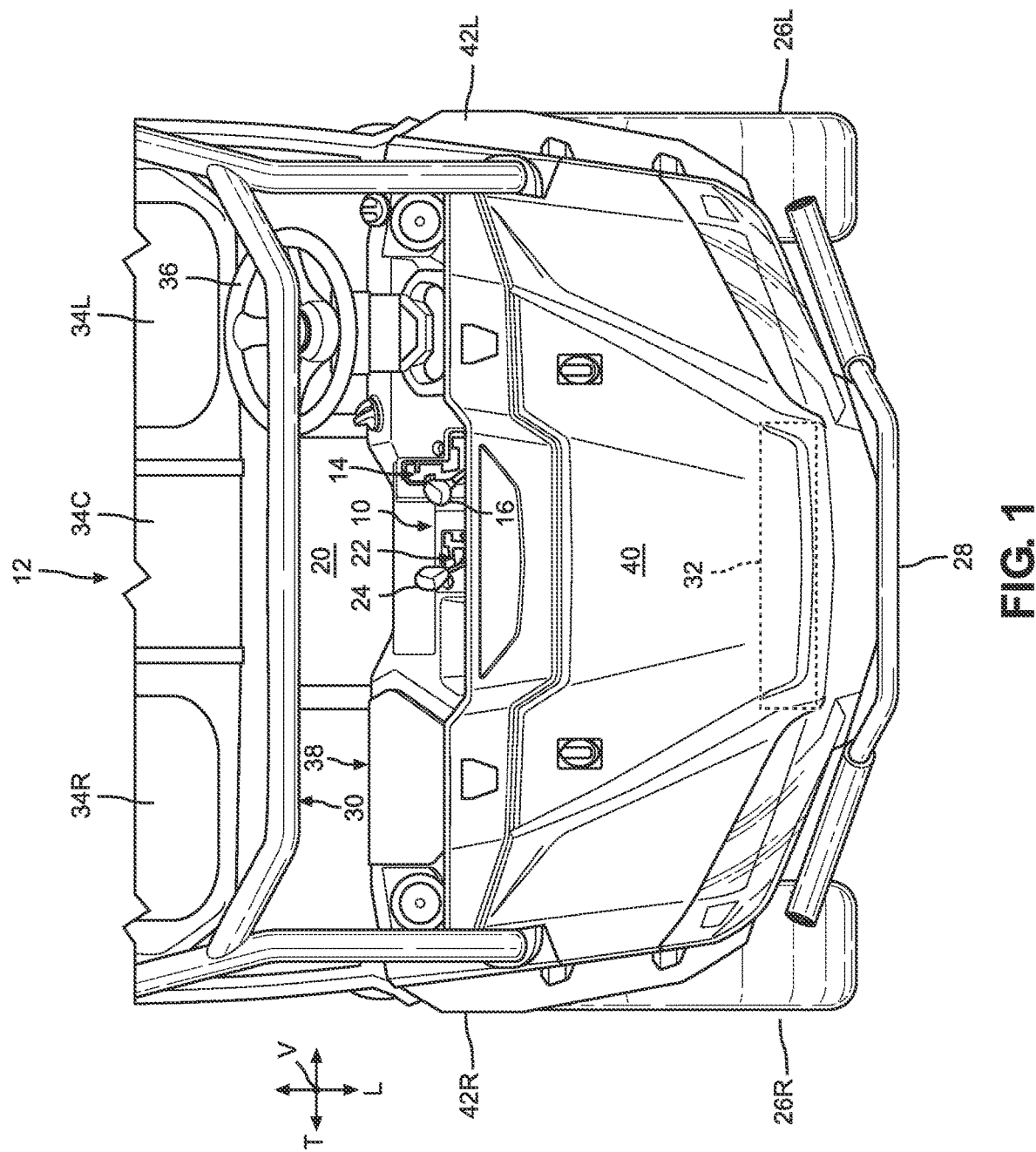
FIG. 1 is a top perspective view of a vehicle including a gate shift system made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A vehicle can include a passenger compartment adjacent to and behind the front space in the longitudinal direction L of the vehicle. The vehicle can include one or more driver inputs such as, but not limited to, a shift gate system that allows the driver of the vehicle to select any one of a plurality of transmission gear ratios. The shift gate system can include an opening through which the shift lever extends. The opening can face toward the passenger space and be in fluid communication with the front space. Thus, heated air in the front space can enter the passenger space by flowing through the opening in the shift assembly. The opening can direct the heated ambient air at the driver and/or the passenger(s) of the vehicle.

The driver of the vehicle and any passenger(s) in the passenger space can perceive this heated air as a discomfort, especially during operation of the vehicle in relatively warm ambient air temperatures. Similarly, operation of the vehicle during relatively cold ambient air temperatures can permit an inrush of cold air into the passenger space. The driver and any passenger(s) can also perceive this inrush of cold air as a discomfort. Further, this inrush of cold air can have an adverse impact on a heater designed to heat the ambient air that is in the passenger space.

In an effort to curtail or stop the flow of heated air (or cold air) from the front space of the vehicle through the opening in the shift gate system, the shift gate system can include a movable cover that is attached to the shift lever and moves with the shift lever and closes the opening on either side of the shift lever. The shift lever can include a biasing structure such as, but not limited to, a metal spring that biases the shift lever in a predetermined direction and/or position. It can be desirable to design the movable cover as a relatively thin, plastic structure so that the movable cover is light in weight and provides little or no resistance to the biasing structure.

However, the thin, plastic cover might not provide a desired durability for a vehicle that can be driven on an unimproved path (such as but not limited to a dirt road or a forest trail), or an unmarked path (such as but not limited to an open field or through a forest without a trail). For example, the thin, plastic cover can be damaged by water, mud, stones and/or other debris when applied to a vehicle that is specialized for travel along an unimproved path or an unmarked path.

Accordingly, it can be desirable to provide a shift gate system for a vehicle that can advantageously curtail, or stop, the flow of ambient air through the opening in the shift gate system, resist damage from water, mud, stones and/or other debris, and avoid adversely impacting the biasing structure for the shift lever.

FIG. 1 illustrates an embodiment of a shift gate assembly 10 for a vehicle 12 made in accordance with principles of the disclosed subject matter. FIG. 1 is a top view of a front portion of the vehicle 12. The remaining portion of the vehicle 12 is omitted for clarity and simplicity of the drawing. The vehicle 12 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed shift gate assembly 10 can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
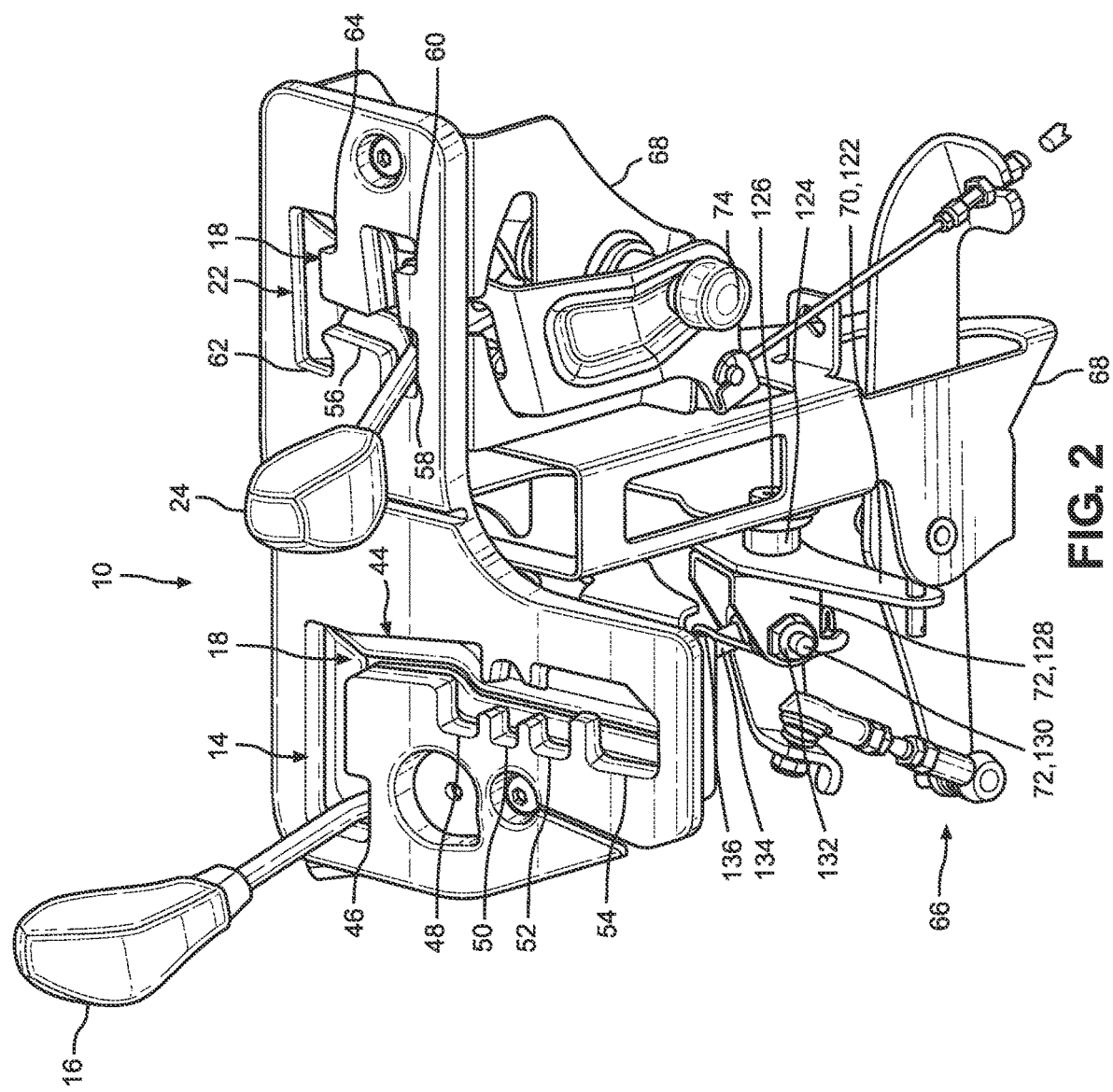
FIG. 2 is a perspective view of the shift gate system of FIG. 1.

Referring to FIGS. 1 and 2, the shift gate assembly 10 can include a first lever opening 14, a shift lever 16 extending through the first lever opening 14 and a gate seal 18 overlapping the first lever opening 14. The gate seal 18 can close or overlap the portion of the first lever opening 14 that is not occupied by the shift lever 16. Thus, the gate seal 16 can advantageously curtail, if not stop, the flow of air through the first opening 14 and into a passenger space 20 of the vehicle 12.

The shift lever 16 can be connected to a multiple gear ratio transmission (not shown) such that movement of the shift lever 16 to different positions within the first lever opening 14 can cause the transmission to engage a corresponding one of the gear ratios, or cause the transmission to be in a neutral state, or cause the transmission to be in a parked state.

The vehicle 12 can be configured for selective operation in a two-wheel drive mode, and a four-wheel drive mode. The shift gate assembly 10 can include a second lever opening 22 and a mode select lever 24 connected to a clutch (not shown), a rear differential (not shown) and a front differential (not shown) such that movement of the mode select lever 24 to different positions within the second lever opening 22 can selectively engage and disengage the clutch, selectively lock and unlock the rear differential, and selectively lock and unlock the front differential. The gate seal 18 can close or overlap the portion of the second lever opening 22 that is not occupied by the mode select lever 24. Thus, the gate seal 18 can advantageously curtail, if not stop, the flow of air through the second lever opening 22 and into a passenger space 20 of the vehicle 12. Further details of the gate seal 18 are described below.

Referring to FIG. 1, the vehicle 12 can include a pair of front wheels 26L, 26R, a front bumper 28, a frame assembly 30, a heat exchanger 32 (shown in phantom), a plurality of seats 34C, 34L, 34R, a steering wheel 36, an instrument panel 38 and a plurality of body panels 40, 42L, 42R.

The front bumper 28 can be a front end of the vehicle 12, or the front end of the hood 40 can be the front end of the vehicle 12 if the front bumper 28 is omitted from the vehicle 12. The front bumper 28 can be described as a part of or separate from the frame assembly 30.

The frame assembly 30 can support the other structures of the vehicle 12 such as, but not limited to, an internal combustion engine (not shown), the transmission (not shown), the wheels 26L, 26R, the heat exchanger 32, the seats 34C, 34L, 34R and the instrument panel 38. One or more portions of the frame assembly 30 can be exposed such as, but not limited to, the portion that bounds an upper portion of the passenger space 20.

The seats 34C, 34L, 34R, the steering wheel 36 and the instrument panel 38 can be located in the passenger space 20 with the instrument panel 38 located between the front space of the vehicle 12 and the seats 34C, 34L, 34R in a longitudinal direction L of the vehicle 12. The center seat 34C can space apart the left seat 34L and the right seat 34R in the transverse direction T of the vehicle 12. The seats 34C, 34L, 34R can be integrated into a common seat structure such as, but not limited to, a bench seat.

The body panels 40, 42L, 42R can cover portions of the frame assembly 30 and extend along the wheels 26L, 26R. The hood 40 shown in FIG. 1 can cover a center portion of the front space of the vehicle 12 with respect to the transverse direction T of the vehicle. The fenders 42L, 42R can cover side portions of the front space, abut the hood 40, and include an arch that extends around a portion of a respective one of the front wheels 26L, 26R.

The heat exchanger 32 can be mounted on the frame assembly 30 at a location that is adjacent to the front bumper 28. The hood 40 can be spaced above the heat exchanger 32 and a front space of the vehicle 12 in a vertical direction V of the vehicle 12 and extend in the longitudinal direction L and a transverse direction T of the vehicle 12 to cover the heat exchanger 32 and a front space of the vehicle 12 from above.

The heat exchanger 32 can be any air-to-fluid heat exchanger that is configured to cool operating fluids such as but not limited to battery coolant, engine coolant, transmission fluid, engine oil, or engine intake air that has been compressed by a turbocharger or a supercharger. Without the gate seal 18, heated air that exits the heat exchanger 32 can flow through one or both of the lever openings 14, 22 and enter the passenger space 20. In the exemplary embodiment of FIG. 1, the heat exchanger 32 can transfer heat from engine coolant to the ambient air, and be referred to as a radiator.

Referring to FIG. 1 the first lever opening 14 can face the center seat 34C and the right seat 34R and the second opening 22 can face the center seat 34C. Heated air that passes through the lever openings 14, 22 can be directed toward a passenger in the center seat 34C or the right seat 34R. Since the gate seal 18 can close or overlap the lever openings 14, 22, the gate seal 18 can at least curtail, if not stop, the flow of heated air from the heat exchanger 32 through the lever openings 14, 22 and into the passenger space 20.

Referring to FIG. 2, the first lever opening 14 can include a main slot 44, a park slot 46, a reverse slot 48, a neutral slot 50, a high slot 52 and a low slot 54. The second opening 22 can include a mode main slot 56, a two-wheel drive slot 58, a first differential slot 60, a four-wheel drive slot 62, and a second differential slot 64. The slots 46, 48, 50, 52, 54, 58, 60, 62, 64 can also be described as gate slots. The slots 44 46, 48, 50, 52, 54 can form a first gate that restricts motion of the shift lever 14 to follow a predetermined pattern. The slots 58, 60, 62, 64 can form a second gate that restricts motion of the mode select lever 24 to follow a predetermined pattern.

A mechanism 66 can connect the shift gate system 10 to the transmission, the clutch, the rear differential and the front differential. The mechanism 66 can include at least one lever, or at least one link, or at least one rod, or at least one cable, or any combination of lever(s), link(s), rod(s) and cable(s). The mechanism 66 can be configured to transmit motion of the shift lever 14 into any of the slots 46, 48, 50, 52, 54 into an input to the transmission that causes the transmission to engage a park gear, operate in a neutral state, engage the reverse gear, or selectively engage any one of the forward drive gear ratios, respectively. The mechanism 66 can be configured to select a two-wheel drive mode in which the rear wheels drive the vehicle 12 and the rear differential is in a locked state when the mode select lever 24 is placed in the two-wheel drive slot 58. The mechanism 66 can be configured to transmit motion of the mode select lever 24 into the first differential slot 60 into an input to the rear differential that causes the rear differential to operate in an open state. The first differential slot 60 can also be described as a turf slot. The mechanism 66 can be configured to transmit motion of the mode select lever 24 into the four-wheel drive slot 62 into an input to the clutch that causes the clutch to engage the front differential with the transmission, an input to the rear differential that causes the rear differential to operate in a locked state, and an input to the front differential that causes the front differential to operate in an open state. The mechanism 66 can be configured to transmit motion of the mode select lever 24 into second differential slot 62 into an input to the clutch that causes the clutch to engage the front differential with the transmission, an input to the rear differential that causes the rear differential to operate in a locked state, and an input to the front differential that causes the front differential to operate in a locked state.

Optionally, the mechanism 66 can be configured to transmit motion of the shift lever 16 into the park slot into an input of the rear differential to cause the rear differential to operate in a locked state when the mode select lever 24 is in the open differential slot 60. Further, the mechanism 66 can be configured to transmit motion of the shift lever 16 into the high slot 52 into an input of the rear differential to cause the rear differential to operate in the opened state when the mode select lever 24 is in the open differential slot 60.

The shift gate assembly 10 can include a bracket structure 68, a first pivot assembly 70 and a second pivot assembly 72. The first pivot assembly 70 and the second pivot assembly 72 can connect the shift lever 14 to the bracket structure 68. The bracket structure 68 can be connected to the instrument panel 38 and/or to the frame assembly 30. The bracket structure 68 can include a single bracket or a plurality of brackets.

The first pivot 70 can include a first bracket 122 and a collar 124. The collar 124 can be rotatably mounted on a threaded shaft or bolt 126 that is connected to the bracket structure 68. A threaded nut can secure the collar 124 onto the threaded shaft 126 in the same manner or similar manner as described below with respect to the second pivot 72. The second bracket 128 can be connected to the first bracket 122 so that the brackets 128, 122 move as unit and do not move relative to each other. The first bracket 122 together with the second pivot 72 can pivot relative to the bracket structure 68 about the threaded shaft 126.

The second pivot assembly 72 can include a second bracket 128, a threaded shaft or bolt 130 and a nut 132. The second bracket 128 can be supported on and connected to the first bracket 122 and can have a general U-shape with the base of the U-shaped abutting the first bracket 122. The shift lever 16 can include a collar (not shown) rotatably mounted on the threaded shaft 130 at a location that is between the two legs of the U-shape. The shift lever 16 can pivot relative to the second bracket 128 about the threaded shaft 130. The nut 132 and the threaded shaft 130 can secure the shift lever 16 to the second bracket 128.

The shift gate assembly 10 can include a biasing structure 134 connected to each of the second bracket 128 and the shift lever 16 to bias the shift lever 16 toward the gate slots 48, 50, 52, 54. For example, the biasing structure 134 can be a coil spring that includes a first end 136 connected to the shift lever 16 and a second end connected to the second bracket 128. The second end is obstructed from view by the second bracket 128. The threaded shaft 130 can pass through the center of the coil of the biasing structure 134.

The shift gate assembly 10 can include a third pivot assembly 74 and a fourth pivot assembly (not shown) that connects the mode select lever 24 to the bracket structure 68. The fourth pivot assembly is obstructed from view in FIG. 2 by the bracket structure 68. The mode select lever 24 can pivot about the third pivot assembly 74 when the mode select lever 24 moves between the two wheel drive slot 58 and the open differential slot 60, or between the four-wheel drive slot 62 and the locked front differential slot 64. The mode select lever 24 can pivot about the fourth assembly pivot when the mode select lever 24 moves between one of the slots 58, 60 and one of the slots 62, 64. The structure of the third and fourth pivot assemblies can be the same as or similar to the second pivot assembly 72.

Figure 3:
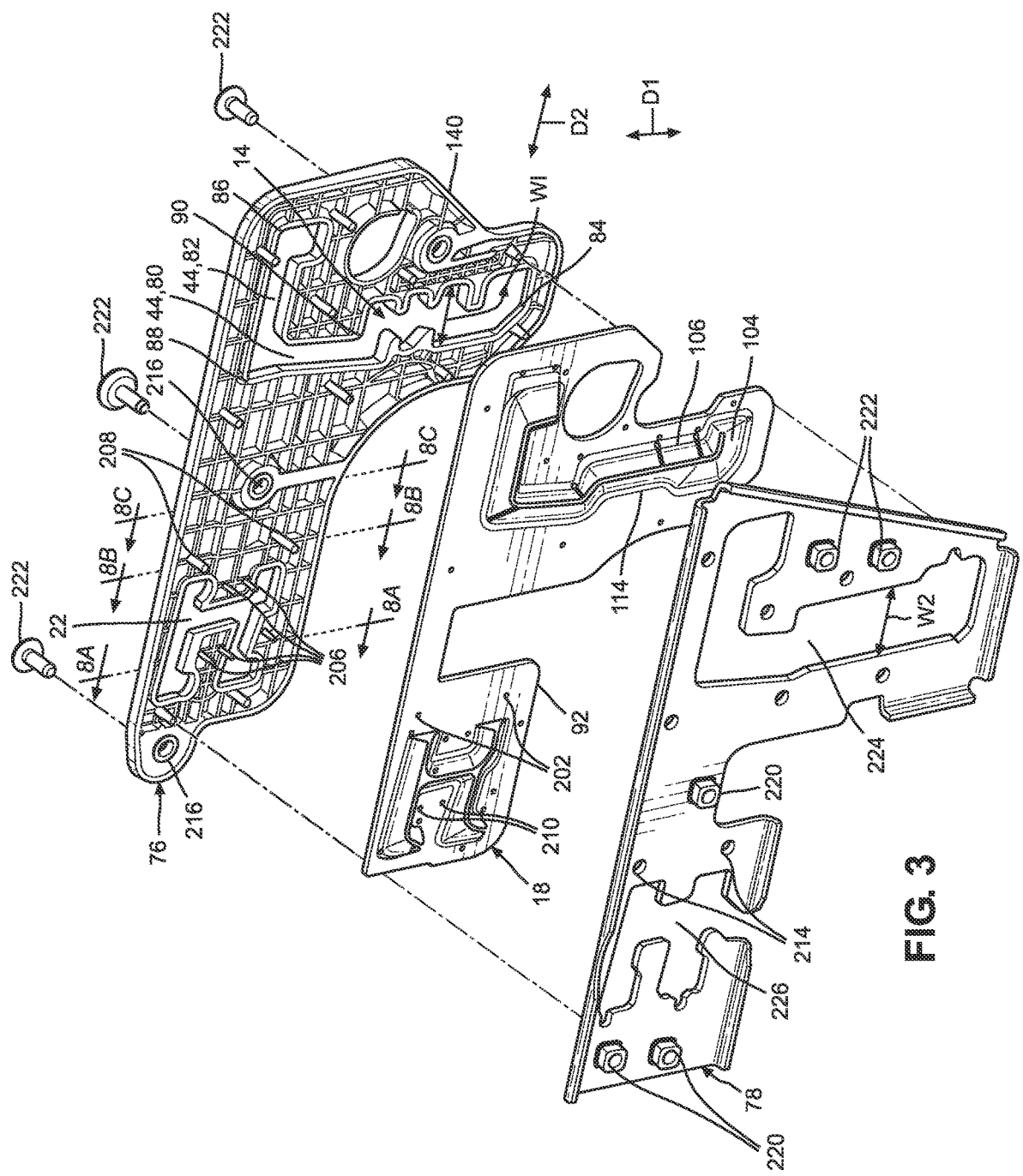
FIG. 3 is an exploded perspective view of a shift plate, a gate seal, and an instrument panel plate of the shift gate system of FIG. 2.

Referring to FIG. 3, the shift gate assembly 10 can include a shift plate 76 and an instrument panel plate 78. The gate seal 18 can be sandwiched between the shift plate 76 and the instrument panel plate 78. The shift plate 76 can include the first lever opening 14 and the second lever opening 22.

Figure 5:
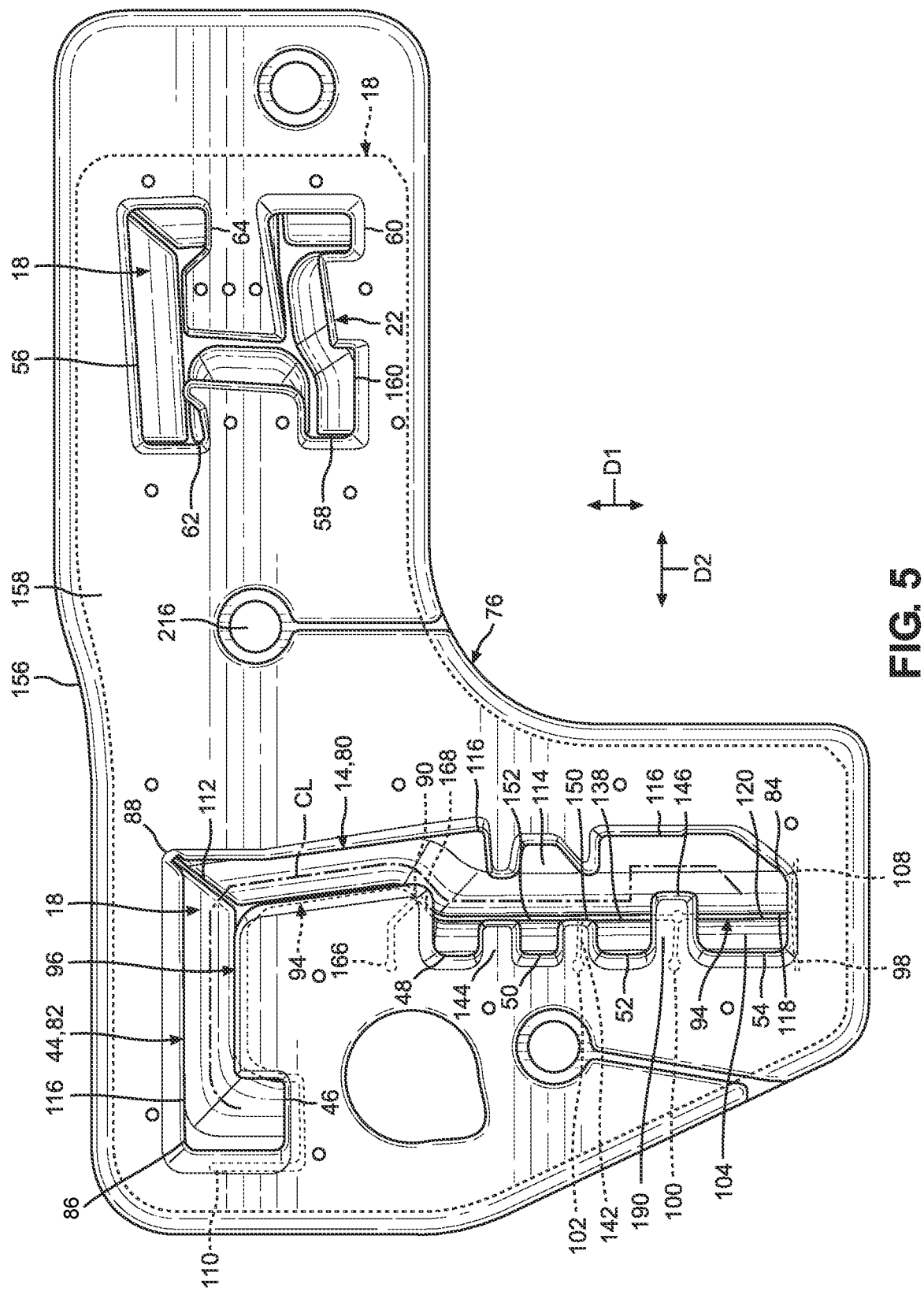
FIG. 5 is a plan view of the shift plate and the gate seal shown in FIG. 3.

Referring to FIGS. 3 and 5, the main slot 44 of the first lever opening 14 can include a first main slot 80, a second main slot 82, a first end corner 84, a second end corner 86, a common corner 88, and an intermediate corner 90. The first main slot 80 can extend from the first end corner 84 to the common corner 88 and generally along a first direction D1. The first main slot 80 can intersect the second main slot 82 at the common corner 88. The second main slot 82 can extend from the common corner 88 to the second end corner 86 and generally along a second direction D2. The first direction D1 can be inclined with respect to the vertical direction V and the longitudinal direction L of the vehicle 10 and the second direction D2 can be substantially parallel to the transverse direction T of the vehicle 10 such that one of ordinary skill in the art would perceive the second direction D2 as being parallel to the transverse direction T.

The gate slots 48, 50, 52, 54 can extend from the first main slot 80 and the park slot 46 can extend from the second main slot 82. The gate slots 48, 50, 52, 54 can extend from the first main slot 80 in the second direction D2 such that one of ordinary skill in the art would perceive the gate slots 48, 50, 52, 54 as being parallel to the second main slot 82. The park slot 46 can extend from the second main slot 82 in the first direction D1 such that one of ordinary skill in the art would perceive the park slot 46 as being parallel to the first main slot 80.

The shift lever 16 can pivot about the first pivot 70 when the shift lever 16 moves in the first main slot 80 between the common corner 88 in the first end corner 84 or when the shift lever 16 moves into and out of the park slot 46. The shift lever 16 can pivot about the second pivot 72 when the shift lever 16 moves along the second main slot 82 or moves into and out of any of the gate slots 48, 50, 52, 54.

Figure 4:
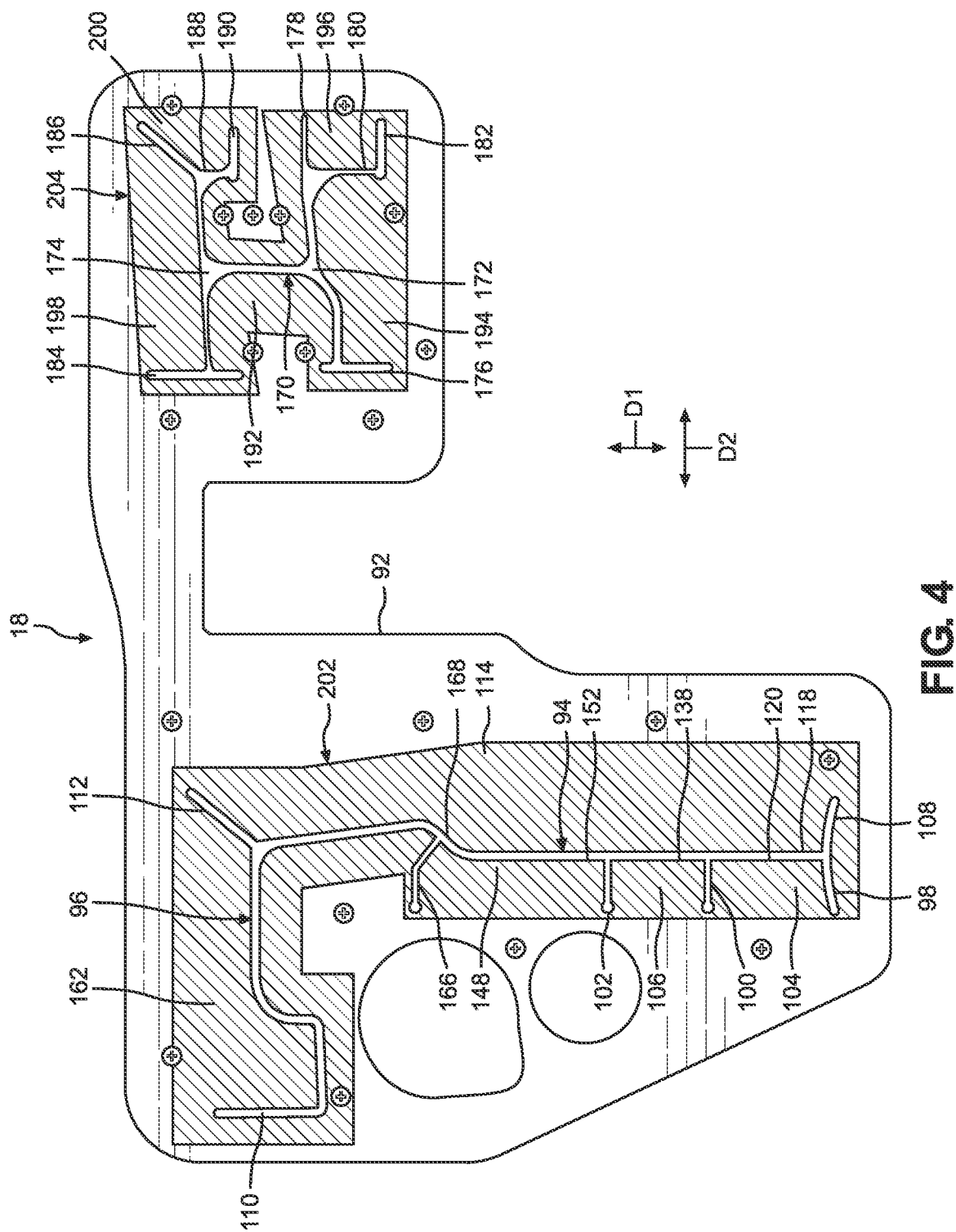
FIG. 4 is a plan view of the gate seal of FIG. 3.

Referring to FIGS. 4 and 5, the gate seal 18 can include a main body 92, a first main slit 94, a second main slit 96, a first end slit 108, a second end slit 110 and an intermediate slit 112. The slits 94, 96, 108, 110, 112 can pass through the main body 92. The first main slit 94 can extend from the first end slit 108 to the intermediate slit 112 and the second main slit 96 can extend from the intermediate slit 112 to the second end slit 110. The first main slit 94 can extend along the first main slot 80 and the second main slit 96 can extend along the second main slot 82. The first main slit 94 can include a shape that is complimentary to the first main slot 80 and the second main slit 96 can include a shape that is complimentary to the second main slot 82. The first main slit 94 and the second main slit 96 can be described collectively as a main slit or as a slit.

Referring to FIG. 5, the shift plate 76 can include a peripheral edge 116 that surrounds the first lever opening 14. The peripheral edge 116 can extend along the entirety of the first main slot 80, the second main slot 82, the park slot 46, the reverse slot 48, the neutral slot 50, the high slot 52 and the low slot 54. The main slot 44 can include a centerline CL that is equidistant from opposing portions of the peripheral edge 116 with respect to the second direction D2.

The first main slit 94 and the second main slit 96 can be spaced away from the centerline CL. The first main slit 94 can be offset from the centerline CL in the second direction D2 toward each of the gate slots 48, 50, 52, 54. That is, the first main slit 94 can be located between the centerline CL and at least a portion of each of the gate slots 48, 50, 52, 54 with respect to the second direction D2. Offsetting the first main slit 94 away from the centerline CL and toward the gate slots 48, 50, 52, 54 can aid the biasing structure 134 in biasing the shift lever 16 to rest in the selected one of the gate slots 48, 50, 52, 54 when the shift lever 16 is not in operation by the driver of the vehicle 12.

The offset for the first main slit 94 can also avoid an adverse impact on the spring rate for the biasing structure 134. For example, the spring rate for the biasing structure 134 can be the same as or marginally greater than the spring rate for a biasing structure of a shift gate assembly that does not include the gate seal 18. Thus, an operator of the shift lever 16 can perceive little or no difference in the load applied to move the shift lever 16 out of any of the gate slots 48, 50, 52, 54 as compared to the load applied to a shift lever for a shift gate assembly that does not include the gate seal 18.

When the shift lever 14 is in the park slot 46, the vehicle 12 is not moving and heated air from the heat exchanger 32 may not flow toward the first lever opening 14 or the second lever opening 22. When the shift lever 14 is in the reverse slot 48, the vehicle is traveling in a reverse direction and heated air from the heat exchanger 32 may not flow toward the first lever opening 14 or the second lever opening 22. However, the vehicle 12 can be driven in a forward direction and heated air from the heat exchanger 32 can flow toward openings 14, 22 when the shift lever 14 is in the high slot 52 or the low slot 54. As will be described below in further detail, the gate seal 18 can be configured with enhanced flexibility such that the gate seal 18 can advantageously curtail, or stop, the flow of heated air through the first lever opening 14 when the shift lever 16 is in the high slot 52 or the low slot 54.

Returning to FIG. 4, the gate seal 18 can include a first main flap 114 formed by the first main slit 94, the first end slit 108 and the intermediate slit 112. Referring to FIGS. 4 and 5 collectively, the first main flap 114 can extend along the first main slot 80 in the first direction D1 as the first main flap 114 extends from the first end slit 108 to the intermediate slit 112. Generally, the gate seal 18 can slightly increase the load applied to the shift lever 16 to move the shift lever 16 into and out of the gate slots 46, 48, 50, 52, 54 and along the main slot 44. The slits 108, 112 can separate the main flap 114 from the remainder of the gate seal 18 such that the gate seal 18 is deformed only in the vicinity of the shift lever 16. By comparison, a gate seal that omits the slits 108, 112 can be elastically stretched by the shift lever 16 at locations corresponding to the slits 108, 112 as the shift lever 16 moves along the main slot 44. The driver of the vehicle 12 can perceive this elastic stretching of the gate seal as additional resistance to moving the shift lever 16. Thus, the main flap 114 can avoid the elastic stretching and the flexibility of the gate seal 18 can be enhanced so that the load applied by the driver of the vehicle 12 to move the shift lever 16 can be reduced compared to a gate seal that does not include the first end slit 108 and the intermediate slit 112. Thus, the driver can perceive a more acceptable resistance when moving the shift lever 16 along the first lever opening 14.

The first main flap 114 can cover a majority of the first main slot 80. That is, the first main flap 114 can cover portions of the main slot 80 on both sides of the centerline CL. For example, the first main flap 114 can include a first edge 118 that borders the first main slit 94 from the first end slit 108 to the intermediate slit 112. The first edge 118 can be located between the centerline CL and each of the gate slots 48, 50, 52, 54 with respect to the second direction D2. The first edge 118 can be located closer to the gate slots 48, 50, 52, 54 than to the centerline CL as measured in the second direction D2. Thus, the first main flap 114 and the centerline CL can overlap each other and the first main flap 114 can cover a majority of the first main slot 80 when the shift lever 16 is in any of the gate slots 46, 48, 50, 52, 54.

Figure 6:
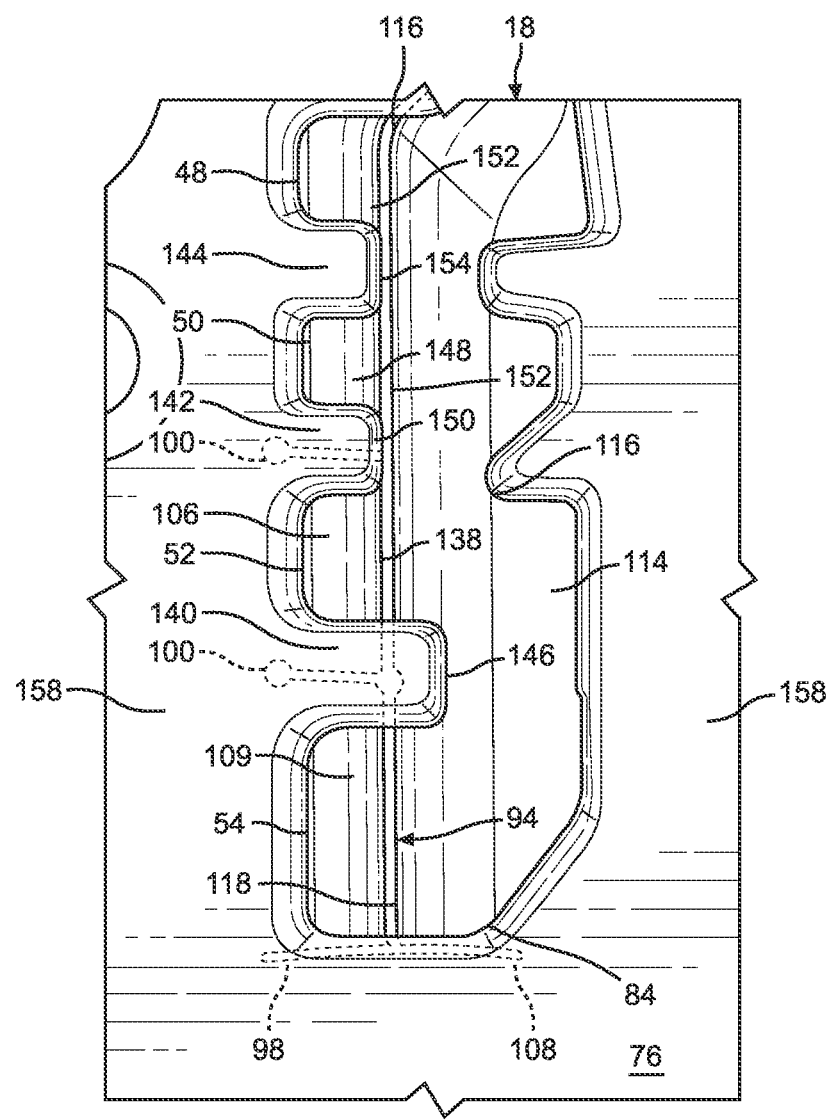
FIG. 6 is a plan view of an enlarged portions of FIG. 5.

Referring to FIGS. 4-6, the gate seal 18 can include a first gate slit 98, a second gate slit 100, a third gate slit 102, a first gate flap 104 and a second gate flap 106. The gate slits 98, 100, 102 can extend from first main slit 94. The first gate slit 98, the first end slit 108 and the first main slit 94 can intersect each other at a common location. The first gate slit 98 and the first end slit 108 can extend away the first main slit 94 in opposite directions in the second direction D2.

The second gate slit 100 can extend from the first main slit 94 in the second direction D2. The first gate flap 104 can be located between the first gate slit 98 and the second gate slit 100 and formed by the first gate slit 98, the second gate slit 100 and the first main slit 94. The first gate flap 104 can include a second edge 120 that extends along the first main slit 94. The second edge 120 can oppose the first edge 118 in the second direction D2. The first edge 118 of the first main flap 114 can be located between the second edge 120 of the first gate flap 104 and the centerline CL of the main slot 44.

The third gate slit 102 can extend from the first main slit 94 in the second direction D2. The second gate flap 106 can be located between the second gate slit 100 and the third gate slit 102 and formed by the second gate slit 100, the third gate slit 102 and the first main slit 94. The second gate flap 106 can include a third edge 138 that extends along the first main slit 94. The third edge 138 can oppose the first edge 118 in the second direction D2. The first edge 118 of the first main flap 114 can be located between the third edge 138 of the second gate flap 106 and the centerline CL of the main slot 44 when viewed from a position above and orthogonal to the first and second directions D1, D2.

The first gate flap 104 can cover the low slot 54 when the shift lever 16 is spaced away from the low slot 54 and the second gate flap 106 can cover the high slot 52 when the shift lever 16 is spaced away from the high slot 52. The gate slits 98, 100, 102 can permit the gate flaps 104, 106 to deform independent of one another. Further, the first gate flap 104 can be spaced away from the high slot 52 and the second gate flap 106 can be spaced away from the low gate slot 54. Thus, the gate seal 18 can curtail, or stop, the flow of heated air through the high slot 52 when the shift lever 16 is in the low slot 54 and curtail, or stop, the flow of heated air through the low slot 54 when the shift lever 16 is in the high slot 52.

Figure 7A:
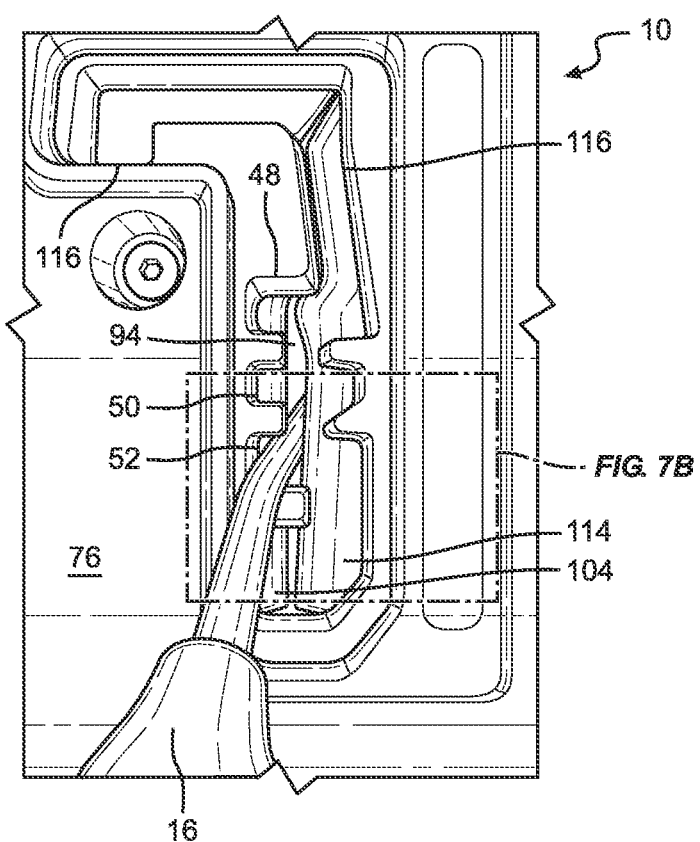
FIG. 7A is a plan view of a portion of FIG. 2.
Figure 7B:
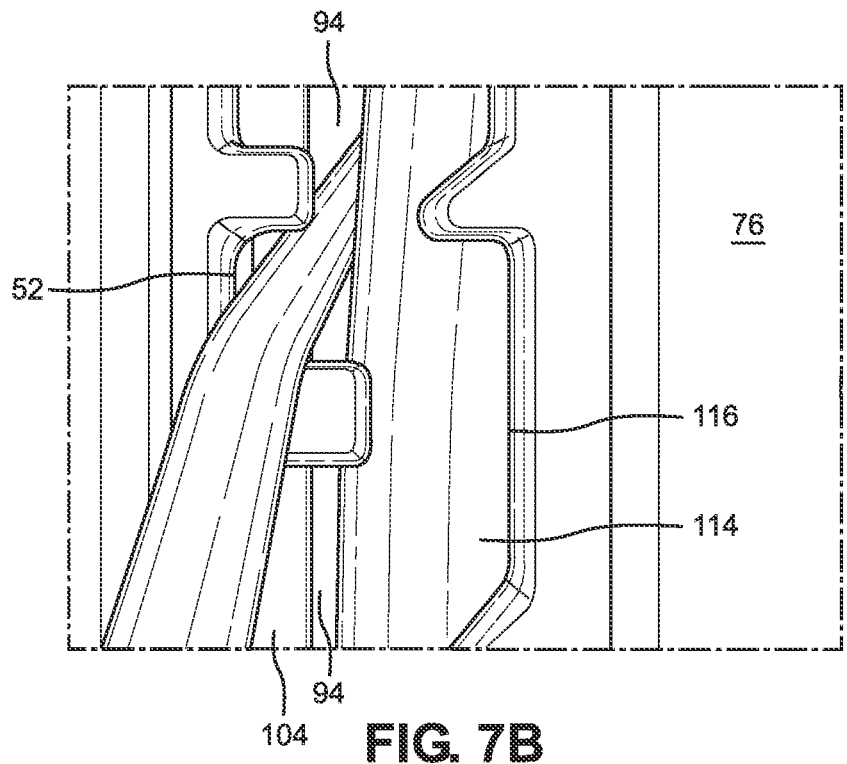
FIG. 7B is a plan view of an enlarged portion of FIG. 7A.

FIGS. 7A and 7B illustrate the independent deformation of the second gate flap 106 with respect to the first gate flap 104. The shift lever 16 is located in the high slot 52 and the first gate flap 104 is in the normally closed position so that the first gate flap 104 covers the low slot 54. Although the first main slit 94 is widened in the vicinity of the shift lever 16, the width of the first main slit 94 along the first gate flap 104 is substantially unchanged from its normal width. Thus, the gate seal 18 can at least curtail the flow of heated air through the first lever opening 14. A similar operation of the second gate flap 106 can occur when the shift lever 16 is moved into the low slot 54.

The independent movement of the gate flaps 104, 106 can also reduce the load applied to the shift lever 16 to move the shift lever 16 into the respective one of the gate slots 52, 54 because less material of the gate seal 18 is deformed by the shift lever 16. Thus, the gate flaps 104, 106 can contribute to the driver's positive perception of little or no difference in the load applied to move the shift lever 16 as compared to the load applied to a shift lever for a shift assembly that does not include the gate seal 18 or a gate seal that does not include the gate flaps 104, 106.

Referring to FIGS. 5 and 6, the shift plate 76 can include a first projection 140, a second projection 142 and a third projection 144 that extends in the second direction D2.

The first projection 140 can be located between the low slot 54 and the high slot 52 and overlap the first gate flap 104 and the second gate flap 106. The first projection 140 can extend across the first main slit 94 and onto the first main flap 114. The first projection 140 can terminate in the second direction D2 at a first portion 146 of the peripheral edge 116 that overlaps the first main flap 114. The first portion 146 of the peripheral edge 116 can be spaced away from the first main slit 94 and located between the first main slit 94 and the centerline CL of the first main slot 80. The first projection 140 can overlap the second gate slit 100.

Referring to FIGS. 4-6 collectively, the gate seal 18 can include a third gate flap 148. The second projection 142 can be located between the high slot 52 and the neutral slot 50 and overlap the second gate flap 106 and the third gate flap 148. The second projection 142 can terminate in the second direction D2 at a second portion 150 of the peripheral edge 116 that is aligned with the third edge 138 of the second gate flap 106 in the first direction D1 and the second direction D2. Since the third edge 138 bounds the main slit 94 and the second portion 150 of the peripheral edge 116 is aligned with the third edge 138, the second portion 150 of the peripheral edge 116 can be aligned with the main slit 94. The second projection 142 can overlap the third gate slit 102.

The third projection 144 can be located between the neutral slot 50 and the reverse slot 48 and overlap the third gate flap 148. The third gate flap 148 can include a fourth edge 152. The third projection 144 can terminate in the second direction D2 at a third portion 154 of the peripheral edge 116 that is aligned with the fourth edge 152 of the second gate flap 106 in the first direction D1 and the second direction D2. Since the fourth edge 152 bounds the first main slit 94 and the third portion 154 of the peripheral edge 116 is aligned with the fourth edge 152, the third portion 154 of the peripheral edge 116 can be aligned with the first main slit 94.

The shift plate 76 can include an outer peripheral edge 156 that forms an exterior boundary of the shift plate 76 and an interior portion 158 that extends from the outer peripheral edge 156 to the peripheral edge 116 that surrounds the first lever opening 14 and to a second peripheral edge 160 that surrounds the second lever opening 22. Each of the flaps 114, 104, 106, 148 can extend from the interior portion 158 to the main slit 94.

The third gate flap 148 can cover the reverse slot 48 and the neutral slot 50 when the shift lever 16 is spaced away from the reverse slot 48 and the neutral slot 50. The shift lever 16 can deflect the third gate flap 148 away from the reverse slot 48 and the neutral slot 50 when the shift lever 16 is placed in either the reverse slot 48 or the neutral slot 50. However, the vehicle 12 is likely not moving or moving at a very slow speed when the shift lever 16 is in the neutral slot 50, and the vehicle 12 can be traveling in a reverse direction when the shift lever 16 is in the reverse slot 48. Thus, the flow rate of heated ambient air through the gate slots 48, 50 can be zero or nearly zero and it can be acceptable for the third gate flap 148 to at least partially uncover both gate slots 48, 50 when the shift lever 16 is located in either one of the gate slots 48, 50.

Referring to FIG. 4, the gate seal 18 can include a second main flap 162 that is bound by the second main slit 96, the second end slit 110 and the intermediate slit 112. The second main flap 162 can terminate at a fifth edge 164 that opposes and is spaced away from a respective portion of the peripheral edge 116 in the first direction D1. Referring to FIG. 5, the second main slit 96 can be offset from the centerline CL in the first direction D1 toward the park slot 46.

Referring to FIGS. 4 and 5, the gate seal 18 can include a corner slit 166 that extends from the first main slit 94 adjacent to the intermediate corner 90 of the shift plate 76.

The corner slit 166, the first main slit 94 and the third gate slit 102 can bound the third gate flap 148. The slits 108, 110, 112, 166 can improve the flexibility of the gate seal 18 as compared to a gate seal that does not include the slits 108, 110, 112, 166. Further, the slits 108, 110, 112, 166 can be located along the lever opening 14 to prevent or reduce the ability of the shift lever 16 to fold the main flaps 94, 96 as the shift lever moves along the main slots 80, 82. For example, the intermediate slit 112 can extend at an angle with respect to the first direction D1 such as, but not limited to, a forty-five degree angle. As another example, the first main slit 94 can include an angled segment 168 that forms an acute angle with respect to each of the first direction D1 and the second direction D2. The corner slit 166 can include an angled segment that forms an acute angle with respect to each of the first direction D1 and the second direction D2 and a straight portion that extends in the second direction D2. The angled segment of the corner slit 166 can extend approximately perpendicularly from the angled segment 168 of the main slit 94.

Referring to FIGS. 4-6, the gate seal 18 can include flaps and slits that are similar to the flaps and slits described above with respect to the shift lever 16. For example, the gate seal 18 can include a third main slit 170, a fourth gate slit 172, a fifth gate slit 174, a sixth gate slit 176, a seventh gate slit 178, an eighth gate slit 180, a ninth gate slit 182, a tenth gate slit 184, and eleventh gate slit 186, a twelfth gate slit 188, a thirteenth gate slit 190, a third main flap 192, a fourth gate flap 194, a fifth gate flap 196, a sixth gate flap 198 and a seventh gate flap 200. The slits 170, 172, 174 can bound the third main flap 192. The slits 172, 176, 180 can bound the fourth gate flap 194. The slits 178, 180, 182 can bound the fifth gate flap 196. The slits 174, 184, 186 can bound the sixth gate flap 198. The slits 186, 188, 190 can bound the seventh gate flap 200.

The third main slit 170 and the gate slits 172, 176 can be offset from a centerline of the second lever opening 22 such that the slits 170, 172, 174 are closer to a first opposing portion of the peripheral edge 160 than to the second opposing portion of the peripheral edge 160 that opposes the first opposing portion. The centerline of the second lever opening 22 is omitted from FIG. 5. However, the centerline would have a shape that includes a center portion that extends in or at a narrow acute angle to the first direction D1 and two end portions that extend in or at a narrow acute angle to the second direction D2, where the two end portions are spaced apart from each other by the center portion.

The gate seal 18 can be formed from any appropriate resilient material such as but not limited to natural rubber or synthetic rubber. Rubber materials can have a relatively large coefficient of friction. The frictional force between the gate seal 18 and the levers 16, 24 can cause the flaps 104, 104, 114, 148, 162, 192, 194, 196, 198, 200 to fold onto themselves, which can increase the force required to move the shift lever 16 and the mode select lever 24 along the respective openings 14, 22. In an effort to reduce the frictional resistance of the levers 16, 24, the gate seal 18 can include a pair of flocking areas 202, 204 formed on a side of the gate seal 18 that faces the lever openings 14, 22. The flocking areas 202, 204 are indicated by the cross-hatched area in FIG. 4. Flocking can be applied to the gate seal 18 in each of the flocking areas 202, 204. The flocking can be a short strand nylon fiber that is glued onto the surface of the gate seal 18. The flocking can have a coefficient of friction that is lower than that of the gate seal 18. Thus, the friction between the gate seal 18 and the levers 16, 24 can be reduced and folding of the gate seal 18 by the levers 16, 24 can be reduced or prevented.

FIGS. 3 and 8A-8C show an alignment system that can facilitate the proper alignment during the assembly of the gate seal 18, the shift plate 76 and the instrument panel plate 78. The shift plate 76 can include a plurality of short projections 206 and a plurality of long projections 208 that project from the side of the shift plate 76 that faces the gate seal 18. The long projections 208 can be longer than the short projections 206. The projections 206, 208 can be spaced apart and distributed about the interior portion 158 of the shift plate 76.

The gate seal 18 can include a plurality of first holes 210 and a plurality of second holes 212. A respective one of the short projections 206 can pass through a respective one of the first holes 210 and a respective one of the long projections 208 can pass through a respective one of the second holes 212. A cross-sectional dimension of the projections 206, 208 can be larger than a corresponding cross-sectional dimension of the holes 210, 212 so that the projections 206, 208 are press-fit into the respective holes 210, 212. For example, the projections 206, 208 and the holes 210, 212 can have a circular cross-sectional shape and the diameter of the projections 206, 208 can be larger than a diameter of the respective holes 210, 212. The press-fit can permit the projections 206, 208 to hold the gate seal 18 on the shift plate 76 as the subassembly of the shift plate 76 and the gate seal 18 is connected to the instrument panel plate 78.

The instrument panel plate 78 can include a plurality of third holes 214, each corresponding to a respective one of the second holes 212 and large projections 208. The large projections 208 can pass through the gate seal 18 and the instrument panel plate 78 via the second holes 212 and the third holes 214. Thus, the third holes 214 can guide proper alignment of the instrument panel plate 78 with the subassembly of the gate seal 18 and the shift plate 76. The short projections 206 can stop inside the first holes 210 or abut the instrument panel plate 78.

The shift plate 76 can include at least one first bolt hole 216. The instrument panel plate 78 can include at least one second bolt hole 218 that is aligned with the first bolt hole 216 and at least one nut 220 that is aligned with the first and second holes 216, 218. The bolt 222 can extend through the first and second holes 216, 218 and be threaded into the nut 220. FIG. 3 shows a plurality of first bolt holes 216, a plurality of second bolt holes 218, a plurality of nuts 220 and a plurality of bolts 222.

Referring to FIG. 3, the instrument panel plate 78 can include a third lever opening 224 and a fourth lever opening 226 that are complementary to and aligned with the first lever opening 14 and the second lever opening 22, respectively. The first lever opening 14 can have a first width W1 measured in the second direction D2 at any location along the first main slot 80 with respect to the first direction D1. The second lever opening 224 can have a second width W2 measured in the second direction D2 at any location with respect to the first direction D1 that corresponds to the first width W1. The second width W2 can be larger than the first width W1. This relationship can provide clearance for the flaps 104, 106, 114, 148 to deflect into and through the lever openings 14, 224. The width of the of second main slot 82 measured in the first direction D1 can be smaller than a width of the third lever opening 224 measured in the first direction D1 at a location with respect to the second direction D2 that corresponds to the measured width of the second main slot 82.

Figure 8A:
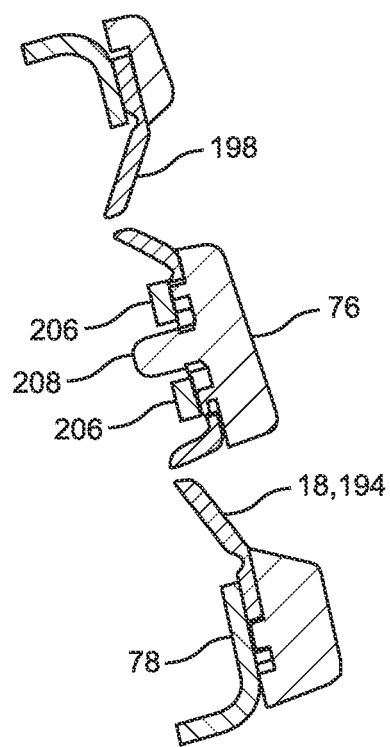
FIGS. 8A, 8B and 8C are cross-sectional views taken along section lines 8A-8A, 8B-8B and 8C-8C, respectively, of FIG. 3.
Figure 8B:
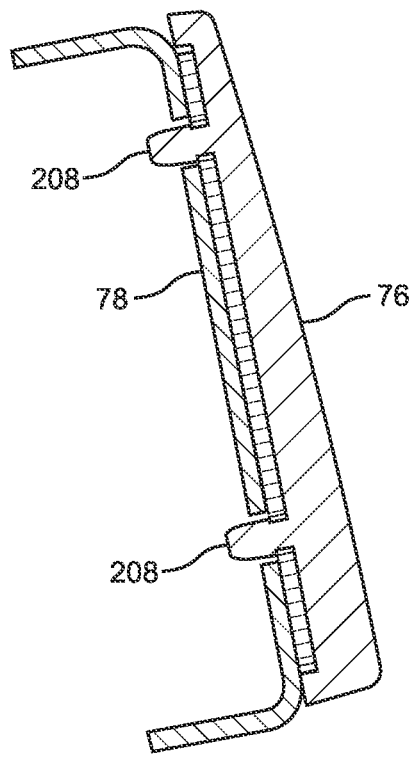
Figure 8C:
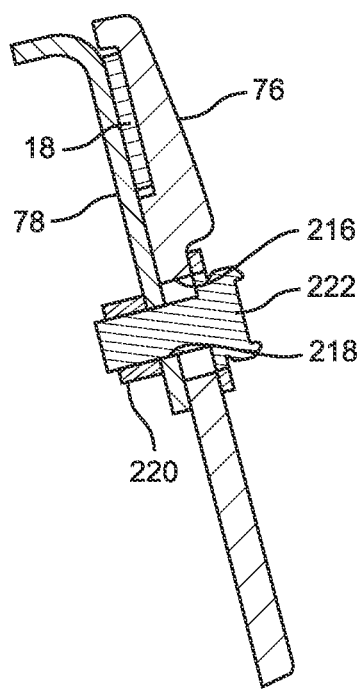
Figure 9:
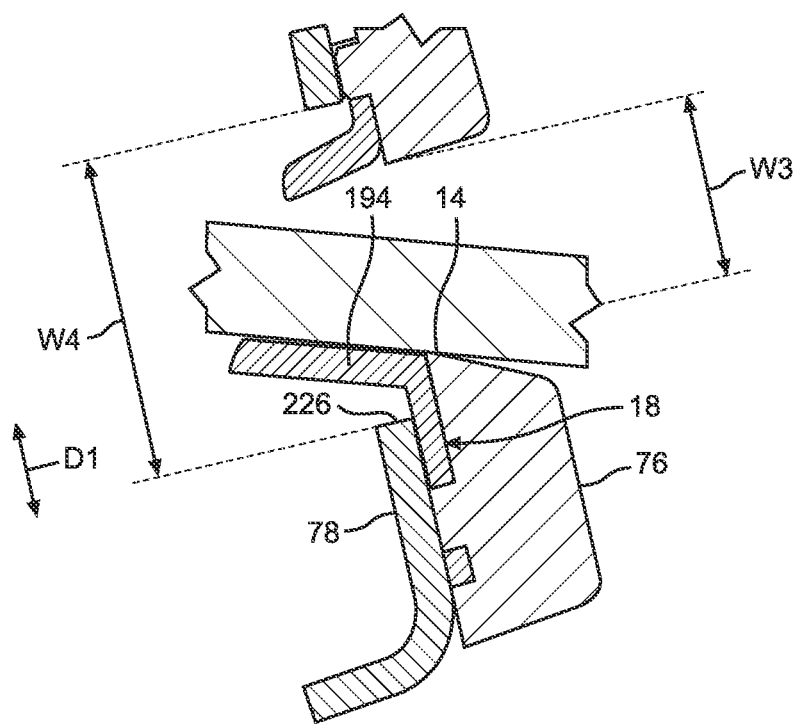
FIG. 9 is an enlarged portion of FIG. 8A with a select lever added and shows deformation of the gate seal of FIG. 3 by the select lever.

FIG. 9 is an enlarged view of the lower portion of FIG. 8A and shows an exemplary difference in widths of the second lever opening 22 and the fourth lever opening 226. The second lever opening 22 can include a third width W3 measured in the first direction D1 and the instrument panel plate 78 can include a fourth width W4 measured in the first direction and at a location with respect to the second direction D2 that corresponds to the location of the third width W3. The fourth width W4 can be greater than the third width W3. This relationship can provide clearance for the flap 194 to deflect into and through the lever openings 14, 224. The second and fourth openings 22, 226 can be similarly dimensioned to accommodate the remaining flaps 192, 196, 198, 200.

While certain embodiments of the invention are described above, it should be understood that the invention can be embodied and configured in many different ways without departing from the spirit and scope of the invention.

For example, embodiments are disclosed above in the context of shift gate assembly that includes a shift lever and a mode select lever shown in FIG. 1. However, exemplary embodiments of the shift gate assembly can omit the mode select lever 24 for a vehicle 12 that is configured as a permanent two-wheel drive vehicle or as an on-demand all-wheel drive vehicle that can automatically switch between a two-wheel drive mode and a four-wheel drive mode. Further, instead of manually locking and unlocking the front differential and/or the rear differential, the vehicle 12 can be configured to automatically switch between a locked differential mode and an unlocked differential mode.

Instead of an inverted J-shape, the first lever opening 14 can have any appropriate shape such as, but not limited to, an H-shape, a stair shape, or a J-shape. Further, the first lever opening can include additional gate slots spaced away from the high slot in the second direction D2 and extending in the first direction D1 that can include an upshift slot and a downshift slot that can permit the driver of the vehicle 12 to manually change the forward drive gear ratio.

Instead of a single gate seal 18, the shift gate assembly 10 can include a first gate seal for the first lever opening 14 and a separate, second gate seal for the second lever opening 22. Further, the mode select lever 24 can be separated from the shift gate assembly 10 and mounted adjacent to the modified shift gate assembly or at a location that is spaced away from the shift gate assembly 10 such as but not limited to the floor of the vehicle or a center console of the vehicle.

Instead of addressing the flow of heated ambient air through the shift gate assembly 10, the gate seal 18 can be configured to curtail, or stop, the flow or passage of any appropriate substance such as, but not limited to water, mud, snow or small stones, cold air, etc.

When describing the offset nature of the various slits with respect to a centerline of the openings 14 and 22, the offset is from a perspective of view taken from a position normal to the surface of the shift plate 76. Thus, when viewed from a position normal to the surface of the shift plate 76, the gate slits 94, 96, will be spaced away from the centerline CL that is located equidistant from each side of the opening 14 and runs along the length of the opening 14 in the first direction D1. Similarly, when viewed from a position normal to the surface of the shift plate 76, the gate slits 170, 172, 176, will be spaced away from a centerline located equidistant from each side of the opening 22 and runs along of the opening 22.

The shift gate assembly 10 described above can include four different modes that can be manually selected using the mode select lever 24. However, any one of these four modes can be configured to be automatically selected by a driver assist system such as, but not limited to, a traction control system or a torque vectoring system. For example, an alternate embodiment of the vehicle 12 can include a front traction control system that can prevent or reduce wheel spin of the front wheels 26L, 26R. The vehicle 12 can include an electronic control unit (also referred to as an ECU or a controller or a central processing unit or a CPU or a microcontroller) that is configured to operate in a front traction control mode and determine when one or both or the front wheels 26L, 26R are slipping on or spinning above the traveling surface. The controller can be configured with hardware alone or in combination with software to selectively lock the front differential when the controller detects wheel spin of one of the front wheels 26L, 26R. When the controller detects both front wheels 26L, 26R slipping on or spinning relative to the traveling surface, the controller can be configured to apply a brake torque to the spinning wheels and/or reduce engine output torque.

The mode select lever 24 can cause the controller to operate in the front traction control mode when the mode select lever 24 is the first differential slot 62. Thus, the second differential slot 64 and a portion of the mode main slot 58 that extends from the second differential slot 64 and stops before the first differential slot 62 can be replaced by continuing the solid structure of the shift plate 76 or attaching a structure that covers the portion of the mode main slot 58 and the second differential slot 64 or obstructs movement of the mode select lever 24 into the second differential slot 64.

The exemplary gate seal 18 of FIGS. 1-9 can be used with this modified shift plate because the modified shift plate can cover or obstruct access to the eleventh gate slit 186, the twelfth gate slit 188, the thirteenth gate slit 190 and a portion of the fifth gate slit 174. Thus, a gate seal 18 of the same design can be used for different configurations of the vehicle 12. This can reduce part cost and simplify inventory control for the manufacturer of the vehicle and for vehicle maintenance and repair providers.

What is claimed is:

1. A shift gate assembly, comprising:
   a shift plate including a lever opening, the lever opening including an opening centerline located equidistant from opposing sides of the opening,
   a gate seal made of an elastic material and connected to the shift plate and extending along the lever opening, and including a slit extending along the lever opening and offset with respect to the opening centerline; and
   a shift lever extending through the lever opening and the slit, selectively movable along the lever opening and the slit, and configured to elastically deform the gate seal as the shift lever moves along the slit, wherein
   the shift plate includes a first edge defined by the lever opening, and
   the gate seal includes a second edge defined by the slit and which colinearly overlaps with at least a portion of the first edge when viewed from above the shift plate.

2. The shift gate assembly according to claim 1, wherein
   the shift plate includes an interior portion and a peripheral edge that surrounds the lever opening,
   the gate seal includes a flap extending from the interior portion to the slit, and
   any portion of the flap that is spaced away from shift lever overlaps a corresponding portion of the lever opening.

3. The shift gate assembly according to claim 1, wherein
the lever opening includes a main slot extending along the opening centerline and a gate slot extending from the main slot and in a direction that intersects the opening centerline,
the gate seal includes,
a first flap extending across the gate slot and covering the gate slot, and
a second flap opposing the first flap, overlapping the main slot, and extending along the main slot in a direction that is parallel to the opening centerline,
the slit separates the first flap from the second flap, and
the shift lever is selectively movable into the gate slot and elastically deforms the first flap when the shift lever is in the gate slot.

4. The shift gate assembly according to claim 3, further comprising:
a lever spring connected to the shift lever and biasing the shift lever away from the main slot and toward the gate slot when the shift lever is at a location in the lever opening that is aligned with the gate slot, wherein
the lever spring and the second flap bias the shift lever toward the gate slot when the shift lever is in the lever opening and aligned with the gate slot.

5. The shift gate assembly according to claim 1, wherein
the lever opening includes,
a main slot extending along the opening centerline,
a first gate slot extending from the main slot and in a direction that intersects the opening centerline,
a second gate slot extending from the main slot and in a direction that intersects the opening centerline,
the shift plate includes a first projection that extends between the first gate slot and the second gate slot and extends across the slit.

6. The shift gate assembly according to claim 5, wherein
the opening includes a third gate slot and a fourth gate slot, and
the shift plate includes,
a second projection that extends between the second gate slot and the third gate slot and terminates at a second projection edge that is aligned with the slit, and
a third projection that extends between the third gate slot and the fourth gate slot and terminates at a third projection edge that is aligned with the slit.

7. The shift gate assembly system according to claim 5, wherein the gate seal includes,
a first gate slit extending from the slit on a first side of the first gate slot,
a second gate slit extending from the slit and located on a second side of the first gate slot and between the first gate slot and the second gate slot, and
a third gate slit extending from the slit, adjacent to the second gate slot, and spaced away from the first gate slit and the second gate slit.

8. A method of using the shift gate assembly according to claim 1, comprising:
providing the shift plate, gate seal, and shift lever on a vehicle that includes a front compartment that contains a heat source and a passenger compartment;
locating the shift plate and gate seal such that they separate the front compartment from the passenger compartment;
preventing air from the front compartment from being transmitted to the passenger compartment by locating a majority of the slit in the gate seal behind the shift plate as viewed from a position normal to the shift plate and directly above the lever opening.

9. The shift gate assembly according to claim 1, wherein
the lever opening includes a main slot and a plurality of gate slots,
the gate seal covers the gate slots when the shift lever is spaced away from the gate slots and includes a flocking coating on both sides of the slit, and
the shift lever abuts the flocking coating and is configured to slide along the flocking coating as the gate lever moves along the slit and into and out of the gate slots.

10. The shift gate assembly according to claim 1, further comprising:
an instrument panel plate, wherein
the gate seal is sandwiched between the instrument panel plate and the shift plate.

11. The shift gate assembly according to claim 10, wherein
the lever opening of the shift plate has a first width measured in a direction that intersects the opening centerline,
the instrument panel plate includes a second lever opening aligned with the lever opening of the shift plate, and
the second lever opening has a second width measured in the direction that intersects the opening centerline, and the second width is greater than the first width.

12. The shift gate assembly according to claim 10, wherein
the instrument panel plate includes a plurality of first through holes,
the gate seal includes a plurality of second through holes, and
the shift plate includes,
a plurality of first projections that extend through a respective one of the first holes and a respective one of the second holes, and
a plurality of second projections that extend through a respective one of the first holes and abut the instrument panel plate.

13. The shift gate assembly according to claim 10, further comprising:
a plurality of bolts passing through the shift plate, the gate seal and the instrument panel plate, wherein
the instrument panel plate includes a front side, a rear side opposite to the front side, and a plurality of nuts welded onto the rear side,
the gate seal abuts the front side, and
the bolts are threaded into a respective one of the nuts.

14. The shift gate assembly according to claim 1, wherein
the shift plate includes a peripheral edge that surrounds the lever opening, a common corner, a first end corner, second end corner, an intermediate corner, and an interior portion adjacent to the intermediate corner,
the interior portion extends away from the lever opening,
the lever opening includes a first main slot and a second main slot intersecting the first main slot at the common corner,
the first main slot extends from the common corner to the first end corner and along the intermediate corner,
the gate seal includes,
a common slit extending from the slit to the common corner,
a first end slit extending from the slit to the first end corner,
a second end slit extending from the slit to the second end corner, and an intermediate slit extending from the slit at a location that is adjacent to the intermediate corner and across the interior portion of the shift plate.

15. A shift gate assembly for a vehicle including an internal combustion engine, a multiple gear ratio transmission, and a plurality of wheels selectively driven by the transmission, the shift gate assembly comprising:
a shift plate including a first gate formed by a first main slot and a plurality of first gate slots extending from and spaced along the first main slot, the first main slot including a first opening centerline, the first gate slots corresponding to a respective one of the gear ratios,
a gate seal made of an elastic material, connected to the shift plate, and extending along the first main slot and the plurality of first gate slots, and including a first slit extending along the first main slot and offset with respect to the first opening centerline as viewed from a position normal to the shift plate and directly above the first main slot of the shift plate, such that air from a front compartment of the vehicle is prevented from entering a passenger compartment of the vehicle; and
a shift lever extending through the first slit, selectively movable along the first main slot and the first slit and into any of the first gate slots, configured to elastically deform the gate seal as the shift lever moves along the first slit and when the shift lever is in any of the first gate slots, and configured to cause the transmission to selectively engage a respective one of the gear ratios when the shift lever is in a corresponding one of the first gate slots, wherein
the shift plate includes a first edge defined by the first gate, and
the gate seal includes a second edge defined by the first slit which colinearly overlaps with at least a portion of the first edge when viewed from above the shift plate.

16. The shift gate assembly according to claim 15, further comprising:
a mode select lever, wherein
the shift plate includes a second main slot and a plurality of second gate slots extending from and spaced along the second main slot, the second main slot including a second opening centerline, the second gate slots corresponding to a respective one of a plurality of drive modes for the vehicle,
the gate seal includes a second slit extending along the second main slot and offset with respect to the second opening centerline as viewed from a position normal to the shift plate and directly above the second main slot of the shift plate,
the mode select lever extending through the second slit selectively movable along the second main slot and the second slit and into any of the second gate slots, and configured to elastically deform the gate seal as the mode select lever moves along the second slit and when the mode select lever is in any of the second gate slots, and to engage a respective one of the drive modes when the mode select lever is in a corresponding one of the second gate slots.

17. The shift gate assembly according to claim 16, wherein the second slit is spaced away from the first slit.

18. A shift gate assembly for selecting one of a plurality of gear ratios of a multiple gear ratio transmission, comprising:
a shift plate including a lever opening slot defined by a left side edge and a right side edge, the lever opening slot including an opening centerline running between and equidistance from each of the left side edge and right side edge,
a gate seal made of an elastic material and connected to the shift plate and extending along the lever opening slot, and including a slit extending along the lever opening slot and offset with respect to the opening centerline such that the gate seal includes a seal edge defined by the slit which colinearly overlaps with at least a portion of one of the left side edge and right side edge when viewed from above the shift plate; and
a shift lever extending through the lever opening slot and the slit, selectively movable along the lever opening slot and the slit, and configured to elastically deform the gate seal as the shift lever moves along the slit, and to cause the transmission to selectively engage a respective one of the gear ratios based on a stopping position of the shift lever in the lever opening slot.

19. The shift gate assembly according to claim 18, wherein
the slit includes a main slit and a plurality of side slits extending from the main slit, wherein at least one of the plurality of side slits is hidden from view and located behind the shift plate as viewed from a position above the shift plate.

* * * * *